(12) United States Patent
Nelson et al.

(10) Patent No.: US 7,884,984 B2
(45) Date of Patent: Feb. 8, 2011

(54) MULTICOLOR HOLOGRAPHIC REPLICATION BY MASKING

(75) Inventors: Brett Ronald Nelson, Logan, UT (US); Michael G. Fickes, Kennett Square, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 179 days.

(21) Appl. No.: 12/080,620

(22) Filed: Apr. 4, 2008

(65) Prior Publication Data
US 2009/0244666 A1    Oct. 1, 2009

Related U.S. Application Data

(60) Provisional application No. 60/910,272, filed on Apr. 5, 2007.

(51) Int. Cl.
*G03H 1/20* (2006.01)
*G03H 1/26* (2006.01)
*G02B 5/32* (2006.01)

(52) U.S. Cl. .............................. 359/12; 359/15; 359/22; 359/900

(58) Field of Classification Search ..................... 359/12
See application file for complete search history.

(56) References Cited

U.S. PATENT DOCUMENTS

| 4,209,250 A | 6/1980 | James et al. |
| 4,973,113 A | 11/1990 | Harrington et al. |
| 4,995,685 A | 2/1991 | Armstrong et al. |
| 5,526,145 A | 6/1996 | Weber |
| 5,930,011 A | 7/1999 | Gambogi, Jr. et al. |
| 6,097,514 A | 8/2000 | Nishikawa |
| 6,824,929 B2 | 11/2004 | Taggi et al. |
| 7,132,200 B1 * | 11/2006 | Ueda et al. ..................... 430/1 |
| 2007/0183011 A1 * | 8/2007 | Yamauchi et al. ............. 359/22 |

OTHER PUBLICATIONS

Tipton et al., "Improved Process of Reflection Holography Replication and Heat Processing", SPIE, vol. 2176, Practical Holography VII, 1994, pp. 172-183.
Kurtz, "Copying Reflection Holograms", Journal of the Optical Society of America, vol. 58, 1968, pp. 856-857.
Denisyuk, "Photographic Reconstruction of the Optical Properties of an Object in its Own Scattered Radiation Field", Soviet Physics-Doklady, vol. 7, No. 6, 1962, pp. 543-545.
PCT International Search Report and Written Opinion for International Application No. PCT/US08/04518 dated Jul. 2, 2008.

\* cited by examiner

*Primary Examiner*—Stephone B. Allen
*Assistant Examiner*—Jade R Chwasz

(57) ABSTRACT

A multicolor hologram (e.g., a two-color hologram) is replicated (copied) into a photosensitive layer by masking to produce a copy (replicate) of the hologram in a manner such that the copy is an accurate and true replication of the hologram (e.g., master hologram), and the copy is characterized to possess a high brightness level and color fidelity comparable to that of the multicolor hologram that was replicated. Both flood and scan modes can be employed in the replication.

14 Claims, 1 Drawing Sheet

MULTICOLOR HOLOGRAPHIC REPLICATION BY MASKING

CROSS-REFERENCE TO RELATED APPLICATION

This application claims priority under 35 U.S.C. §119 from U.S. Provisional Application Ser. No. 60/910,272 (filed Apr. 5, 2007), the disclosure of which is incorporated by reference herein for all purposes as if fully set forth.

BACKGROUND OF THE INVENTION

1. Field of the Invention

This invention pertains to a method for replicating (copying) a multicolor hologram (e.g., a two-color hologram) into a photosensitive layer by masking to produce a copy (replicate) of the hologram in a manner such that the copy is an accurate and true replication of the hologram (e.g., master hologram) and the copy is characterized to possess a high brightness level and good color fidelity/purity comparable to that of the hologram that was replicated.

2. Description of Related Art

Replication by direct contact copying of a master hologram (either a reflection hologram or a transmission hologram) in which the master hologram is in direct contact with a photosensitive layer (e.g., a holographic recording film) is known from the art. With respect to reflection holograms, see, for example, the following references: 1) "Improved Process of Reflection Holography Replication and Heat Processing", by D. F. Tipton, M. L. Armstrong, and S. H. Stevenson, Proc. SPIE, Vol. 2176, p 172-183 in Practical Holography VIII, Stephen A. Benton, Ed.; 2) "Photographic Reconstruction of the Optical Properties of an Object in its Own Scattered Radiation Field", by Yu N. Denisyuk, Soviet Physics-Doklady, 7, pages 543-5 (1962); and 3) "Copying Reflection Holograms", by Clark N. Kurtz, Journal of the Optical Society of America, 58, pages 856-7 (1968); each of these open literature references is incorporated by reference. Pertinent references in the patent literature include U.S. Pat. Nos. 4,995,685; 6,824,929; and 6,097,514, which are incorporated by reference. With respect to transmission holograms, see, for example, U.S. Pat. No. 4,209,250, which discloses a system for making multiple copies from a stationary planar transmission master hologram, and U.S. Pat. No. 4,973,113, which describes a method and apparatus for making a copy of a transmission hologram from a master. An additional open literature reference that covers copying of both reflection and transmission holograms is the replication portions of Chapter 20 of *Optical Holography* by R. J. Collier, C. B. Burchhardt and L. H. Lin, Academic Press (1971), which is incorporated by reference. The prior art teaches that such direct contact copying is done by contacting a photosensitive element, comprised of a photosensitive layer and a smooth coversheet, to a smooth master hologram such that a smooth surface of the coversheet is in direct contact with a smooth surface of the master hologram. It has been found that a method to make a multicolor hologram was needed. The present invention describes such a method.

SUMMARY OF THE INVENTION

In an embodiment, the invention is a method for replicating a volume reflection master hologram comprising:
  a) providing a photosensitive layer having a side and an opposing side;
  b) placing the side of the photosensitive layer in contact with or proximate to the master hologram;
  c) placing a first mask in contact with or proximate to the opposing side of the photosensitive layer masking at least one area of the photosensitive layer;
  d) exposing the photosensitive layer through the first mask with coherent actinic radiation of a first wavelength $\lambda_1$ resulting in a first wavelength exposed layer;
  e) removing the first mask; and
  f) exposing the first wavelength exposed layer with coherent actinic radiation of a second wavelength $\lambda_2$ resulting in a first and second wavelength exposed layer, wherein the first and second wavelength exposed layer is a replicate of the two-color master hologram.

In another embodiment, the invention is a method for replicating a volume reflection master hologram comprising:
  a) providing a photosensitive layer having a side and an opposing side;
  b) placing the side of the photosensitive layer in contact with or proximate to the master hologram;
  c) placing a first mask in contact with or proximate to the opposing side of the photosensitive layer masking at least one area of the photosensitive layer;
  d) exposing the photosensitive layer through the first mask with coherent actinic radiation of the first wavelength $\lambda_1$ resulting in a first wavelength exposed layer;
  e) removing the first mask;
  f) placing a second mask in contact with or proximate to the opposing side of the photosensitive layer that is now the first wavelength exposed layer masking at least one area of the first wavelength exposed layer;
  g) exposing the first wavelength exposed layer with coherent actinic radiation of a second wavelength $\lambda_2$ resulting in a first and second wavelength exposed layer;
  h) removing the second mask; and
  i) exposing the first and second wavelength exposed layer with coherent actinic radiation of a third wavelength $\lambda_3$ resulting in a first, second and third wavelength exposed layer, wherein the first, second and third wavelength exposed layer is a replicate of the three-color master hologram.

In an embodiment, the invention is a method for replicating a volume reflection master hologram comprising:
  a) providing a photosensitive layer having a side and an opposing side;
  b) placing the side of the photosensitive layer in contact with or proximate to the master hologram;
  c) placing a first mask in contact with or proximate to the opposing side of the photosensitive layer masking at least one area of the photosensitive layer;
  d) exposing the photosensitive layer through the first mask with coherent actinic radiation of the first wavelength $\lambda_1$ resulting in a first wavelength exposed layer;
  e) removing the first mask;
  f) placing a second mask in contact with or proximate to the opposing side of the photosensitive layer that is now the first wavelength exposed layer masking at least one area of the first wavelength exposed layer;
  g) exposing the first wavelength exposed layer with coherent actinic radiation of a second wavelength $\lambda_2$ resulting in a first and second wavelength exposed layer;
  h) removing the second mask;
  i) placing a third mask in contact with or proximate to the opposing side of the photosensitive layer that is now the first and second wavelength exposed layer masking at least one area of the photosensitive layer;

j) exposing the first and second wavelength exposed layer with coherent actinic radiation of a third wavelength $\lambda_3$ resulting in a first, second and third wavelength exposed layer;

k) removing the third mask; and l) exposing the first, second and third wavelength exposed layer with coherent actinic radiation of a fourth wavelength $\lambda_4$ resulting in a first, second, third, and fourth wavelength exposed layer, wherein the first, second, third, and fourth wavelength exposed layer is a replicate of the two-color master hologram.

DETAILED DESCRIPTION

Figure 1:
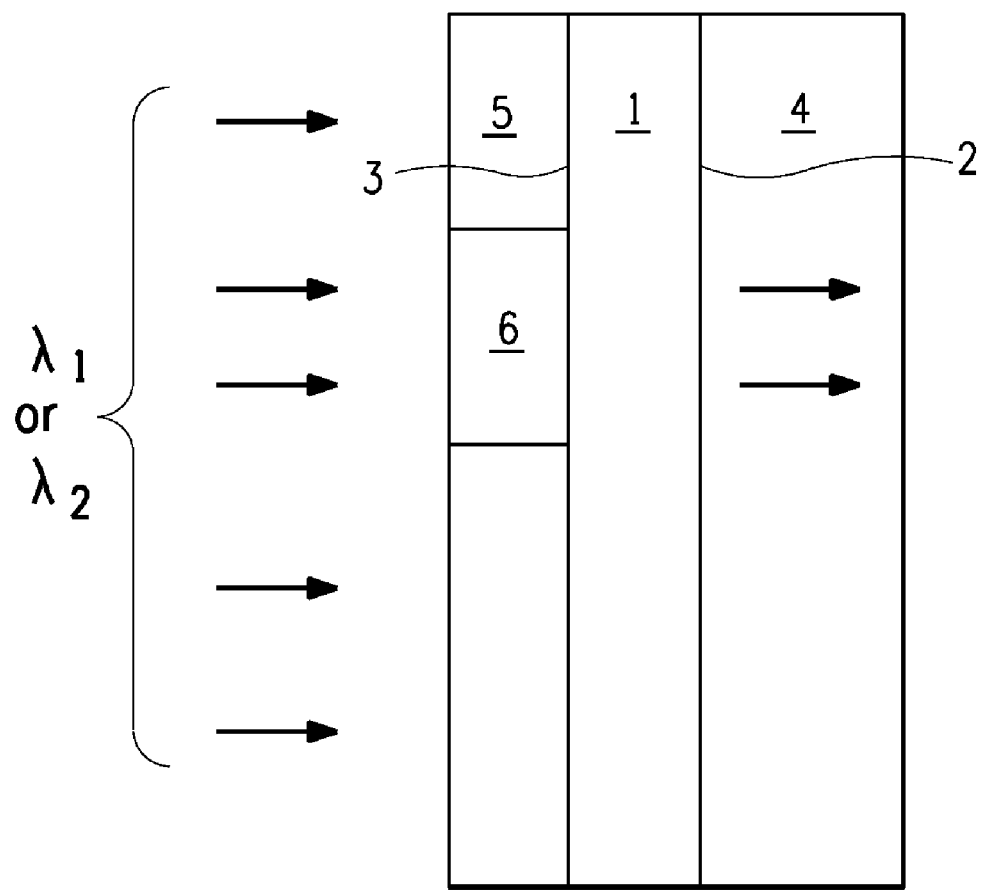
FIG. 1 illustrates from a side view perspective an arrangement of components for masked replication according to an embodiment of the invention.

This invention in various embodiments is method(s) for replicating efficiently multi-color (e.g., two-color, three-color, four-color) volume reflection holograms. The resulting holograms replicated according to this invention are characterized to possess high brightness levels and better color fidelity in relation to similar holograms that are replicated according to prior art replication methods. This invention entails use of a mask(s) (e.g., first and second masks) and a photosensitive layer to replicate a multi-color volume reflection master hologram within the photosensitive layer.

FIG. 1 illustrates a side view of an assembly of key components for masked replication according to an embodiment of the invention. A photosensitive layer 1, which has a side 2 and an opposing side 3, is provided. The side 2 is placed in contact with or proximate to a volume reflection master hologram 4. A mask 5 (e.g., initially a first mask and optionally, later a second mask) having one or more unmasked area(s) 6 is placed in contact with or proximate to the opposing side 3 of the photosensitive layer 1 masking at least one area of the photosensitive layer 1. The photosensitive layer 1 is then exposed to coherent actinic radiation of a first wavelength $\lambda_1$ through the mask. As is indicated with arrows in FIG. 1, light rays incident upon unmasked area(s) 6 are transmitted through the mask 5 to the master hologram 4 while those light rays incident upon masked area(s) are prevented from reaching the photosensitive layer 1 and the master hologram 4 by the mask. After this first exposure, the first mask is removed. In an embodiment, a second exposure is then done with coherent actinic radiation of wavelength $\lambda_2$ without using a second mask. In another embodiment, a second mask is placed where the first mask had been positioned earlier (during the first exposure) prior to the second exposure being done.

The multi-color master volume reflection holograms employed as masters and to be replicated according to this invention can be made of any suitable photosensitive material capable of recording a holographic image, including, but not limited to, dichromated gelatin (DCG) and photopolymer. In an embodiment, DCG is the photosensitive material used in making a master hologram to be used in subsequent replication.

The photosensitive layer used according to the invention to record holographic replicates can be made of any suitable photosensitive material capable of recording a holographic image, including, but not limited to, photopolymer (e.g., holographic recording film), photographic film, and dichromated gelatin (DCG). In an embodiment, the photosensitive layer is a photopolymer. In one embodiment, the photopolymer is a holographic recording film (HRF). The HRF may be an Omnidex® HRF (E.I. DuPont de Nemours, Wilmington, Del.).

The first mask and (when present) the second mask can be made of any materials that effectively block actinic radiation (e.g., visible light) from passing through the masks in areas that are not to be exposed in a given exposure and which effectively transmit actinic radiation (e.g., visible light) in areas that are to be exposed during a given exposure. Suitable masks include, but are not limited to, those made of transparent polymers (e.g., polyester) that effectively transmit actinic radiation of the desired wavelengths in areas to be exposed and which are coated in areas to be blocked with absorptive material(s) (e.g., a black ink) that effectively blocks actinic radiation in coated areas where blocking is desired to prevent exposure to actinic radiation.

In the methods according to the invention, the photosensitive layer having a side and an opposing side is placed between the master hologram and the mask (e.g., first mask). The master hologram is usually, but not necessarily, comprised of a rigid, transparent (e.g., glass) protective cap. The side of photosensitive layer is usually placed in direct contact with the protective cap of the master hologram (if one is present) or in direct contact with a hologram layer of the master (if a protective cap is absent) in order to achieve optical coupling of the photosensitive layer to the master hologram and provide for stability of the coupled system (master, including protective cap if present, and photosensitive layer) during holographic imaging. The mask can either be in contact with or proximate to the opposing side of photosensitive layer. In this invention, the terms "proximate to" with respect to the first mask and photosensitive layer means that the opposing side of the photosensitive layer and a nearest surface of the first mask are spaced within 1 mm of each other.

Exposing the photosensitive layer to coherent actinic radiation of a first wavelength $\lambda_1$ is done through a first mask with the first mask masking at least one area of the photosensitive layer. Any means of producing coherent actinic radiation can be employed. In an embodiment, lasers are used. The first wavelength $\lambda_1$ can lie in any region of the electromagnetic spectrum, including, but not limited to, the visible region, the infra-red region, and the ultraviolet (UV) region. In one embodiment, the first wavelength lies in the visible region. A first wavelength $\lambda_1$ exposure transforms the photosensitive layer into a first wavelength exposed layer.

After the first wavelength exposure has been completed, additional steps may include: (1) in one embodiment, the first mask is removed and exposure to a second wavelength $\lambda_2$ is done without a mask being in place; (2) in another embodiment, the first mask is replaced with a second mask prior to exposure to a second wavelength $\lambda_2$.

Exposing the photosensitive layer to coherent actinic radiation of a second wavelength $\lambda_2$ can be done either without a mask or through a second mask. (This second exposure can be done without a mask since virtually all first exposed areas are no longer photosensitive following the first exposure at the first wavelength.) Any means of producing coherent actinic radiation can be employed; lasers are preferred. The second wavelength $\lambda_2$ can broadly lie in any region of the electromagnetic spectrum, including, but not limited to, the visible region, the infra-red region, and the ultraviolet (UV) region. In one embodiment, the second wavelength lies in the visible region. This second wavelength $\lambda_2$ exposure, together with the first wavelength $\lambda_1$ exposure, transforms the photosensitive layer into a first and second wavelength exposed layer, which is a replicate of the two-color master hologram.

In an embodiment, coherent actinic radiation of the first wavelength $\lambda_1$ and coherent actinic radiation of the second wavelength $\lambda_2$ are within the visible region of the electromagnetic spectrum.

In another embodiment, coherent actinic radiation of the first wavelength $\lambda_1$ and coherent actinic radiation of the second wavelength $\lambda_2$ are independently selected to correspond to light from the group consisting of red light, blue light, and green light with the proviso that light of the first wavelength and light of the second wavelength correspond to different colors.

In another embodiment, coherent actinic radiation of the first wavelength $\lambda_1$ or coherent actinic radiation of the second wavelength $\lambda_2$ corresponds to blue light and wherein at least one of the first wavelength exposed layer and the first and second wavelength exposed layer is color-tuned such that the replicate of the two-color master hologram plays back in the green region of visible light.

In another embodiment, coherent actinic radiation of the first wavelength $\lambda_1$ or coherent actinic radiation of the second wavelength $\lambda_2$ corresponds to green light and wherein at least one of the first wavelength exposed layer and the first and second wavelength exposed layer is color-tuned such that the replicate of the two-color master hologram plays back in the red region of visible light.

In the method for replicating a two-color volume reflection master hologram, the exposing steps (steps d) and f)) can be done in any manner including, but not limited to, exposing in a flood exposure mode or in a scan exposure mode. In case of exposing in a flood exposure mode, the entire layer (photosensitive layer or first wavelength exposed layer) that is being exposed is exposed at the same time to coherent actinic radiation. In case of exposing in a scan exposure mode, only a portion of the entire layer (photosensitive layer or first wavelength exposed layer) that is being exposed is exposed at the same time to coherent actinic radiation. For example, in the scan mode, a moving beam of coherent actinic radiation may be scanned across the entire layer (photosensitive layer or first wavelength exposed layer) over a period of time to effect the scanned exposure. Typically, a flood exposure is done with lower power density over a longer period of time in comparison to a scan exposure.

In general, the relationship between the first wavelength $\lambda_1$ and the second wavelength $\lambda_2$ is not limited. In an embodiment, the absolute value of (the first wavelength $\lambda_1$ minus the second wavelength $\lambda_2$) is at least 7 nm. In an embodiment, the absolute value of (the first wavelength $\lambda_1$ minus the second wavelength $\lambda_2$) is at least 30 nm, preferably at least 40 nm, and more preferably at least 50 nm.

In replication of a two-color hologram, the first mask is designed to effectively block actinic radiation from all areas targeted to be exposed during the second exposure with the second wavelength actinic radiation and to effectively pass actinic radiation of the first wavelength in areas targeted to be exposed during the first exposure. The second mask is optional and, if present, is chosen such that it will effectively block actinic radiation during the second exposure from reaching areas of the first wavelength exposed layer that were previously exposed during the first exposure.

The method for replicating a three-color or four-color volume reflection hologram according to the invention is similar to the method described supra for replicating a two-color volume reflection hologram and the details given herein apply equally to two-color, three-color, and four-color volume reflection holograms except as may be specifically noted somewhere within this specification. A main difference is that a three-color replication involves three different imaging wavelengths (instead of two different imaging wavelengths) and either two or optionally three masks are utilized (instead of one or optionally two masks for two-colors) in replicating a three-color volume reflection hologram according to the invention. Similarly, a main difference is that a four-color replication involves four different imaging wavelengths (instead of two or three different imaging wavelengths) and either three or optionally four masks are utilized (instead of fewer masks for the two-color and three-color cases) in replicating a four-color volume reflection hologram according to the invention.

More specifically, in an embodiment for replicating a three-color volume reflection hologram according to the invention, a photosensitive layer is placed between a master hologram and a first mask. The photosensitive layer is then exposed through the first mask to coherent actinic radiation of a first wavelength $\lambda_1$ resulting in first wavelength exposed layer. The first mask is removed and replaced (in the same location) with a second mask. The first wavelength exposed layer is then exposed through the second mask to coherent actinic radiation of a second wavelength $\lambda_2$ resulting in a first and second wavelength exposed layer. At this point, there are two choices prior to the third exposure. One choice is to do the third exposure without a (third) mask being present, and the other choice is to employ a third mask during the third exposure. If a third mask is employed, it is placed in the same location as the first and second masks were located earlier according to the method. With either choice, the first and second wavelength exposed layer is next exposed to coherent actinic radiation of a third wavelength $\lambda_3$ resulting in a first, second, and third wavelength exposed layer, wherein the first, second and third wavelength exposed layer is a replicate of the three-color master hologram.

In replication of a three-color hologram according to the invention, the first mask is designed to effectively block actinic radiation from all areas except those targeted to be exposed during the first exposure with the first wavelength actinic radiation and to effectively pass actinic radiation of the first wavelength in areas targeted to be exposed during the first exposure. The second mask is designed to at least effectively block actinic radiation from all areas targeted for the third exposure and to effectively pass actinic radiation from all areas targeted for the second exposure with the second wavelength actinic radiation. The third mask is optional and, if employed, is usually designed to block actinic radiation from all areas except those targeted for the third exposure with the third wavelength actinic radiation; the third mask should effectively pass actinic radiation of the third wavelength in those areas targeted for exposure with the third wavelength actinic radiation.

In an embodiment for the method for replicating a three-color volume reflection master hologram described supra, the absolute values of $\lambda_1-\lambda_2$, $\lambda_1-\lambda_3$, and $\lambda_2-\lambda_3$ are each at least 7 nm. In another embodiment, the absolute values of $\lambda_1-\lambda_2$, $\lambda_1-\lambda_3$, and $\lambda_2-\lambda_3$ are each at least 30 nm, preferably at least 40 nm, and more preferably at least 50 nm. In another embodiment, the at least one area masked in step c) is also masked in step f).

More specifically, in an embodiment for replicating a four-color volume reflection hologram according to the invention, a photosensitive layer is placed between a master hologram and a first mask. The photosensitive layer is then exposed through the first mask to coherent actinic radiation of a first wavelength $\lambda_1$ resulting in first wavelength exposed layer. The first mask is removed and replaced (in the same location) with a second mask. The first wavelength exposed layer is then exposed through the second mask to coherent actinic radiation of a second wavelength $\lambda_2$ resulting in a first and second wavelength exposed layer. The second mask is removed and replaced (in the same location) with a third mask. The first and second wavelength exposed layer is then exposed through the third mask to coherent actinic radiation of a third wavelength $\lambda_3$ resulting in a first, second, and third wavelength exposed layer. At this point, there are two choices prior to the fourth exposure. One choice is to do the fourth exposure without a (fourth) mask, and the other choice is to employ a fourth mask during the fourth exposure. With either choice, the first, second, and third wavelength exposed layer is next exposed to coherent actinic radiation of a fourth wavelength $\lambda_4$ resulting in a first, second, third, and fourth wavelength exposed layer, wherein the first, second, third, and fourth wavelength exposed layer is a replicate of the four-color master hologram.

In an embodiment for a method of replicating a four-color volume reflection master hologram as described supra, the absolute values of $\lambda_1-\lambda_2$, $\lambda_1-\lambda_3$, $\lambda_1-\lambda_4$, $\lambda_2-\lambda_3$, $\lambda_2-\lambda_4$, and $\lambda_3-\lambda_4$ are each at least 7 nm. In another embodiment, the absolute values of $\lambda_1-\lambda_2$, $\lambda_1-\lambda_3$, $\lambda_1-\lambda_4$, $\lambda_2-\lambda_3$, $\lambda_2-\lambda_4$, and $\lambda_3-\lambda_4$ are each at least 30 nm, preferably at least 40 nm, and more preferably at least 50 nm. In another embodiment, the at least one area masked in step c) is also masked in steps f) and l).

In a preferred embodiment of a multi-color replication method according to the invention, the first mask blocks actinic radiation from exposing the greatest percentage surface area of the film available for exposure in the (initially) photosensitive film and the percentage of surface area blocked decreases in the order of second mask, third mask (when present), and fourth mask (when present). Such blockage prevents premature exposure and deactivation/interference in areas targeted for a later exposure (e.g., prevents exposure during exposing steps with first and second wavelengths in areas targeted for exposure with a third wavelength). As one example of this preferred embodiment for a three-color replication, the first mask should effectively block actinic radiation of the second and third wavelengths while effectively passing actinic radiation of the first wavelength. The second mask should at a minimum effectively block actinic radiation of the third wavelength while effectively passing actinic radiation of the second wavelength.

EXAMPLES

Example 1

This example illustrates replication of a full chuck of two-color master holograms into holographic recording film (a photopolymer) using a two-color masked sequential flood process according to the invention. The following process steps for replication were conducted in the order as listed.

1) A full master chuck of H2 masters was assembled. The full master chuck was of dimensions 12 inches×18 inches. Each H2 master was 2 inches×2 inches and there were 54 masters in the full chuck. Each H2 master was made by H1-H2 holographic imaging with lasers in dichromated gelatin (DCG) using a well-known method (see Y. Denisyuk, *Optical Holography*, R. J. Collier et al., Academic Press, 1971, especially paragraph 3 on pages 21-22) together with color tuning of exposed and wet processed DCG to lower the playback wavelength to a desired point as is well-known in the art. Each master contained areas that played back at either of two distinct wavelengths—one at a blue wavelength and one at a green wavelength.

2) A polyester mask was made that covered the master chuck allowing laser light to penetrate only in designated areas of each H2 master. The mask was designed such that the vast majority was black. This corresponded with the intent to produce a two-color image that was mostly green after color tuning. The two-color image had only small red areas following color tuning. The small clear areas on the mask correspond to what became red areas in the two-color image. The mask was computer generated and sent to an image setter (Agfa Select Set 7000). The image setter functioned such that polyester passed through an emulsification process in this device to produce black areas of the mask.

3) Photopolymer (DuPont 734-1 Holographic Recording Film (HRF), E. I. DuPont de Nemours, Wilmington, Del.) was vacuum coupled to the surface of the master chuck, after which time the polyester mask was overlaid and vacuum coupled to the surface of the HRF. The mask used was one containing clear areas that transmit visible light and opaque areas that block visible light. Both layers were rolled down to ensure complete coupling.

4) The entire master chuck was then flood exposed with 532 nm laser light for a predetermined period of time of 25 seconds that resulted in an exposure level of 50 mJ/cm2. Only the clear areas of the polyester mask allowed for penetration of the laser light. Since these clear areas of the mask were registered to the areas of the master that play back at 532 nm, all clear areas resulted in 532 nm images.

5) The mask was then removed from the master chuck while the HRF film was kept in place. Once the mask was removed, the entire master chuck was flood exposed with 476 nm laser light for a time of 25 seconds that resulted in an exposure level of 25 mJ/cm2. The previously exposed 532 nm portions remained unaffected by the additional 476 nm exposure as complete polymerization had already occurred during the 532 nm exposure such that these exposed 532 nm portions were no longer photosensitive.

6) The 476 nm and 532 nm exposed HRF that resulted at the end of step 5) was immediately exposed to UV light to prevent any incidental color shifting resulting from ambient light exposure. The approximate ranges for power and exposure time for this step were 6-12 milliwatts and 30-70 seconds, respectively.

7) Following step 6), the exposed HRF was then laminated to 146 Color Tuning Film (CTF) (E. I. DuPont de Nemours, Wilmington, Del.) using a DuPont laminator (E.I. DuPont de Nemours, Wilmington, Del.) operated at a speed of 3.0 m/min and a temperature of 100° C.

8) The combined HRF/CTF from step 7) was then heated for 7 minutes at 150° C. to afford a true and stable volume hologram replicate of the original full H2 master chuck in the photopolymer (exposed and color-tuned HRF) that has been color-tuned such that the imaged portions that were initially blue now play-back as green image portions at approximately 530-550 nm and such that the imaged portions that were initially green now play-back as red image portions at approximately 600-610 nm.

Both of the final green and red image portions of the replicated hologram were characterized to be bright and have good color purity.

Example 2

This example illustrates replication of a full chuck of two-color master holograms into holographic recording film (a photopolymer) using a two-color masked sequential scan process according to the invention. The following process steps for replication were conducted in the order as listed.

1) A full master chuck of H2 masters was assembled. The full master chuck was of dimensions 12 inches×18 inches. Each H2 master was 2 inches×2 inches and there were 54 masters in the full chuck. Each H2 master was made by H1-H2 holographic imaging with lasers in dichromated gelatin (DCG) using a well-known method (see Y. Denisyuk, *Optical Holography*, R. J. Collier et al., Academic Press, 1971, especially paragraph 3 on pages 21-22) together with color tuning of exposed and wet processed DCG to lower the playback wavelength to a desired point as is well-known in the art. Each master contained areas that played back at either of two distinct wavelengths—one at a blue wavelength and one at a green wavelength.

2) A polyester mask was made that covered the master chuck allowing laser light to penetrate only in designated areas of each H2 master. The mask was designed such that the vast majority was black. This corresponded with the intent to produce a two-color image that was mostly green after color tuning. The two-color image had only small red areas following color tuning. The small clear areas on the mask correspond to what became red areas in the two-color image. The mask was computer generated and sent to an image setter (Agfa Select Set 7000). The image setter functioned such that polyester passed through an emulsification process in this device to produce black areas of the mask.

3) Photopolymer (DuPont 734-1 Holographic Recording Film (HRF), E. I. DuPont de Nemours, Wilmington, Del.) was vacuum coupled to the surface of the master chuck, after which time the polyester mask was overlaid and vacuum coupled to the surface of the HRF. The mask used was one containing clear areas that transmit visible light and opaque areas that block visible light. Both layers were rolled down to ensure complete coupling.

4) The entire master chuck was then line scanned with a 532 nm laser beam measuring approximately ⅜ inch×20 inches at a predetermined speed of ⅜ inch per second that resulted in an exposure level of 50 mJ/cm2. The scan time was 33 seconds. Only the clear areas of the polyester mask allowed for penetration of the laser light. Since the entirety of each H2 master was covered with a 532 nm reflector, all clear areas resulted in 532 nm images.

5) The mask was then removed from the master chuck while the HRF film was kept in place. Once the mask was removed, the entire master chuck was line scanned with a 476 nm laser beam measuring approximately ⅜ inch×20 inches at a predetermined speed of ⅜ inch per second that resulted in an exposure level of 25 mJ/cm2. The scan time was 33 seconds. The previously exposed 532 nm portions remained unaffected by the additional 476 nm exposure as complete polymerization had already occurred during the 532 nm exposure such that these exposed 532 nm portions were no longer photosensitive.

6) The 476 nm and 532 nm exposed HRF that resulted at the end of step 5) was immediately exposed to UV light to prevent any incidental color shifting resulting from ambient light exposure. The approximate ranges for power and exposure time for this step were 6-12 milliwatts and 30-70 seconds, respectively.

7) Following step 6), the exposed HRF was then laminated to 146 Color Tuning Film (CTF) (E. I. DuPont de Nemours, Wilmington, Del.) using a DuPont laminator (E.I. DuPont de Nemours, Wilmington, Del.) operated at a speed of 3.0 m/min and a temperature of 100° C.

8) The combined HRF/CTF from step 7) was then heated for 7 minutes at 150° C. to afford a true and stable volume hologram replicate of the original full H2 master chuck in the photopolymer (exposed and color-tuned HRF) that has been color-tuned such that the imaged portions that were initially blue now play-back as green image portions at approximately 530-550 nm and such that the imaged portions that were initially green now play-back as red image portions at approximately 600-610 nm.

Both of the final green and red image portions of the replicated hologram were characterized to be bright and have good color purity.

Example 3 (Comparative)

This comparative example illustrates replication of a full chuck of two-color master holograms into holographic recording film (a photopolymer) using a two-color simultaneous flood process without a mask as known and practiced in the prior art. The following process steps for replication were conducted in the order as listed.

1) A full master chuck of H2 masters was assembled. The full master chuck was of dimensions 12 inches×18 inches. Each H2 master was 2 inches×2 inches and there were 54 masters in the full chuck. Each H2 master was made by H1-H2 holographic imaging with lasers in dichromated gelatin (DCG) using a well-known method (see Y. Denisyuk, *Optical Holography*, R. J. Collier et al., Academic Press, 1971, especially paragraph 3 on pages 21-22) together with color tuning of exposed and wet processed DCG to lower the playback wavelength to a desired point as is well-known in the art. Each master contained areas that played back at either of two distinct wavelengths—one at a blue wavelength and one at a green wavelength.

2) Photopolymer (DuPont 734-1 Holographic Recording Film (HRF), E. I. DuPont de Nemours, Wilmington, Del.) was vacuum coupled to the surface of the master chuck. The photopolymer layer was rolled down to ensure complete coupling.

3) The entire master chuck was then simultaneously flood exposed to both 532 nm and 476 nm laser light for a predetermined period of time of 40 seconds that resulted in an exposure level of 50 mJ/cm2 of 532 nm light and 25 mJ/cm2 of 476 nm light.

4) The 476 nm and 532 nm exposed HRF that resulted at the end of step 3) was immediately exposed to UV light to prevent any incidental color shifting resulting from ambient light exposure. The approximate ranges for power and exposure time for this step were 6-12 milliwatts and 30-70 seconds, respectively.

5) Following step 4), the exposed HRF was then laminated to 146 Color Tuning Film (CTF) (E. I. DuPont de Nemours, Wilmington, Del.) using a DuPont laminator (E.I.

DuPont de Nemours, Wilmington, Del.) operated at a speed of 3.0 m/min and a temperature of 100° C.

6) The combined HRF/CTF from step 5) was then heated for 7 minutes at 150° C. to afford a stable volume hologram replicate of the original full H2 master chuck in the photopolymer (exposed and color-tuned HRF) that has been color-tuned such that the imaged portions that were initially blue now play-back mainly as green image portions at approximately 530-550 nm and such that the imaged portions that were initially green now play-back mainly as red image portions at approximately 600-610 nm.

Although the process of this comparative example affords a stable volume hologram, the hologram obtained has very significant drawbacks relative to those holograms obtained with the inventive processes of Examples 1 and 2. These drawbacks are that the hologram obtained using the process of this Comparative Example 3 has significantly lower brightness and also poorer color purity and color contrast characteristics in comparison to the holograms obtained using the inventive processes as given in Examples 1 and 2. Colors produced under the inventive method are also purer because the viewer isn't seeing two colors at once. While not being bound by theory, the inventors believe that the lower brightness characteristics of the hologram of this comparative example are due to detrimental effects of the simultaneous presence of the 476 nm and 532 nm beams during holographic imaging competing for available differences in refractive index between the unexposed and exposed photosensitive film (e.g., HRF). This is because even though a certain area of the H2 was intended to only playback at a single wavelength, there is still a small amount of light from the unintended wavelength reflecting off that area. As mentioned above, this unintended wavelength is competing for limited available differences in refractive index and thus not leaving it entirely available for the intended wavelength. This sharing of the refractive index results in the intended wavelength appearing more dim and also less pure as the area is not simply reflecting a single wavelength.

What is claimed is:

1. A method for replicating a volume reflection two-color master hologram comprising, in sequence as listed below:
    a) providing a photosensitive layer having a side and an opposing side;
    b) placing the side of the photosensitive layer in contact with or proximate to the master hologram;
    c) placing a first mask in contact with or proximate to the opposing side of the photosensitive layer masking at least one area of the photosensitive layer;
    d) exposing the photosensitive layer through the first mask with coherent actinic radiation of a first wavelength $\lambda_1$ resulting in a first wavelength exposed layer;
    e) removing the first mask; and
    f) exposing the first wavelength exposed layer with coherent actinic radiation of a second wavelength $\lambda_2$ resulting in a first and second wavelength exposed layer, wherein the first and second wavelength exposed layer is a replicate of the volume reflection two-color master hologram.

2. The method of claim 1 wherein after exposing the first mask to the coherent actinic radiation, the first mask is replaced with a second mask, prior to f) being executed.

3. The method of claim 2 wherein the second mask is chosen such that it will effectively block actinic radiation during the second exposure from reaching areas of the first wavelength exposed layer that were previously exposed during the first exposure.

4. The method of claim 1 wherein coherent actinic radiation of the first wavelength $\lambda_1$ and coherent actinic radiation of the second wavelength $\lambda_2$ are within a visible region of the electromagnetic spectrum.

5. The method of claim 4 wherein coherent actinic radiation of the first wavelength $\lambda_1$ and coherent actinic radiation of the second wavelength $\lambda_2$ are independently selected to correspond to light from the group consisting of red light, blue light, and green light with the proviso that light of the first wavelength and light of the second wavelength correspond to different colors.

6. The method of claim 1 wherein coherent actinic radiation of the first wavelength $\lambda_1$ or coherent actinic radiation of the second wavelength $\lambda_2$ corresponds to blue light and wherein at least one of the first wavelength exposed layer and the first and second wavelength exposed layer is color-tuned such that the replicate of the two-color master hologram plays back in a green region of visible light.

7. The method of claim 1 wherein coherent actinic radiation of the first wavelength $\lambda_1$ or coherent actinic radiation of the second wavelength $\lambda_2$ corresponds to green light and wherein at least one of the first wavelength exposed layer and the first and second wavelength exposed layer is color-tuned such that the replicate of the two-color master hologram plays back in a red region of visible light.

8. The method of claim 1 wherein the photosensitive layer is a photopolymer.

9. The method of claim 8 wherein the photopolymer is a holographic recording film.

10. The method of claim 1 wherein the exposing steps d) and f) are done in a flood exposure mode.

11. The method of claim 1 wherein the exposing steps d) and f) are done in a scan exposure mode with a moving beam of coherent actinic radiation.

12. The method of claim 1 wherein the absolute value of the first wavelength $\lambda_1$ minus the second wavelength $\lambda_2$ is at least 7 nm.

13. The method of claim 1 wherein the placing of the side of the photosensitive layer is such that the side of the photosensitive layer is in contact with the master hologram.

14. The method of claim 1 wherein the placing of the first mask in c) is such that the first mask is in contact with the opposing side of the photosensitive layer.

* * * * *